UNITED STATES PATENT OFFICE.

MICHAEL HOWARD, OF VIRGINIA CITY, NEVADA.

IMPROVED HAIR-RESTORATIVE.

Specification forming part of Letters Patent No. 51,319, dated December 5, 1865.

*To all whom it may concern:*

Be it known that I, MICHAEL HOWARD, of Virginia City, county of Story, State of Nevada, have invented a new and improved compound for restoring the hair and causing it to grow again when it has fallen off from the human head by reason of sickness or other causes; and I do hereby declare that the following is a full and exact description of the compounding and use of the same, reference being had to the samples marked No. 1 and No. 2, which accompany this specification.

The nature of my invention relates to a preparation for the human head where the hair has fallen off by reason of sickness or other causes, and it has been found, after an application of this my preparation to the scalp for the period of two or three months the hair will commence to grow upon bald places and a fine head of hair is reproduced.

To enable others to make and use my compound, I will proceed to describe the preparation and the manner of applying the same.

The composition of No. 1 is as follows: I take one gallon of rain-water and add nine ounces of lac-sulphur, one-half ounce spirits of camphor, one and one-half pint of alcohol, two ounces salt, one ounce aqua-ammonia, and twenty-five drops oil rosemary.

For preparing No. 2, I take two gallons of rain-water, add six pounds of the leaves and buds of the nut-pine or *Pinus insigns*, a tree sometimes called the "Monterey pine," found in Monterey, California, which has a peculiarly medicinal adaptation for the propagation and growth of the hair; also, three pounds of pepper-grass, and three pounds of green mustard leaves and branches. I then boil the whole down to one gallon and strain. I then put into a separate vessel four ounces of vegetable tar, four ounces ground mustard, and two ounces of salt. I mix the three thoroughly together, and add it to the gallon of solution above described. When the whole is cold I add one quart of ninety-five per cent. alcohol, when it is ready for use.

The directions for using my preparation are as follows: I first shampoo the head with a solution composed of the following ingredients: To one quart of rain-water I add two table-spoonfuls spirits camphor, one-half ounce spirits ammonia, and one tea-spoonful salts. The above is for the head if it is not entirely bald. If the head is entirely bald, I take two ounces vegetable tar, one ounce ground mustard, and sweet-oil one-half ounce, and mix them thoroughly together without heating. I then spread with this compound a piece of cloth large enough to cover the bald place, which should be kept on over night, and the head washed thoroughly in the morning with castile-soap and rain-water. A friction must also be kept up, and no toilet oil or grease should be used during the time of using my restorative.

After preparing the head as above described, apply one tea-spoonful of No. 1 every morning and rub it in well with a stiff brush; and apply one tea-spoonful every evening in the same manner.

Having thus described my preparation, what I claim and desire to secure by Letters Patent, is—

The combination of recipes No. 1 and No. 2, substantially as stated.

In witness whereof I have hereunto set my hand and affixed my seal at San Francisco, this 20th day of March, A. D. 1865.

MICHAEL HOWARD. [L. S.]

Witnesses:
C. W. M. SMITH,
W. O. ANDREWS.